United States Patent
Aoki et al.

(10) Patent No.: US 8,347,656 B2
(45) Date of Patent: Jan. 8, 2013

(54) APPARATUS FOR AND METHOD OF PROCESSING GLASS OPTICAL FIBER, METHOD OF MANUFACTURING AND METHOD OF DRAWING OPTICAL FIBER

(75) Inventors: Yuta Aoki, Tokyo (JP); Katsuhiko Watanabe, Tokyo (JP); Kiyoshi Arima, Tokyo (JP); Hirokazu Sato, Tokyo (JP); Yoshiharu Taga, Tokyo (JP); Takashi Suzuki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 36 days.

(21) Appl. No.: 12/872,594

(22) Filed: Aug. 31, 2010

(65) Prior Publication Data

US 2010/0319406 A1 Dec. 23, 2010

Related U.S. Application Data

(63) Continuation of application No. PCT/JP2009/053840, filed on Mar. 2, 2009.

(30) Foreign Application Priority Data

| Mar. 5, 2008 | (JP) | 2008-055429 |
| Nov. 13, 2008 | (JP) | 2008-291474 |

(51) Int. Cl.
C03B 37/03 (2006.01)

(52) U.S. Cl. .................. 65/535; 65/435; 65/533; 65/537
(58) Field of Classification Search .................... 65/430, 65/432, 433, 435, 533, 534, 535, 536, 537, 65/539
See application file for complete search history.

(56) References Cited

U.S. PATENT DOCUMENTS 2,474,314 A * 6/1949 Koehne ............................ 241/4
3,060,664 A * 10/1962 Morawski ....................... 55/431

FOREIGN PATENT DOCUMENTS

| JP | 10-282347 | 10/1998 |
| JP | 10-330133 | 12/1998 |
| JP | 2003-335537 | 11/2003 |
| JP | 2004-107190 | 4/2004 |
| KR | 20020019851 B1 * | 3/2002 |

* cited by examiner

Primary Examiner — Matthew Daniels
Assistant Examiner — Lisa Herring
(74) Attorney, Agent, or Firm — Oblon, Spivak, McClelland, Maier & Neustadt, L.L.P.

(57) ABSTRACT

An apparatus includes: an introducer to introduce a glass optical fiber that has passed a pulling mechanism pulling, to draw the glass optical fiber, one end of an optical fiber preform that has been fused by heating; a shredder including a casing connected to the introducer and a shredding mechanism to shred the glass optical fiber introduced by the introducer in the casing into glass optical-fiber pieces; a pipe connected to the casing of the shredder and to carry the glass optical-fiber pieces; and a suction unit connected to the pipe and to suction the glass optical-fiber pieces via the pipe.

3 Claims, 9 Drawing Sheets

APPARATUS FOR AND METHOD OF PROCESSING GLASS OPTICAL FIBER, METHOD OF MANUFACTURING AND METHOD OF DRAWING OPTICAL FIBER

CROSS-REFERENCE TO RELATED APPLICATIONS

This application is a continuation of PCT International Application No. PCT/JP2009/053840 filed on Mar. 2, 2009 which claims the benefit of priority from Japanese Patent Application No. 2008-055429 filed on Mar. 5, 2008 and Japanese Patent Application No. 2008-291474 filed on Nov. 13, 2008, the entire contents of which are incorporated herein by reference.

BACKGROUND OF THE INVENTION

1. Field of the Invention

The present invention relates to an apparatus for and a method of processing a glass optical fiber drawn from an optical fiber preform when drawing an optical fiber while fusing by heating and pulling by a pulling mechanism one end of the optical fiber preform and to a method of manufacturing and a method of drawing an optical fiber.

2. Description of the Related Art

An optical fiber is manufactured by fusing by heating one end of an optical fiber preform made of glass in a draw heating furnace, drawing a glass optical fiber from the one end, and forming a coating made of a resin or the like around the drawn glass optical fiber using a die or the like. The manufactured optical fiber is wound up by a winding machine via a capstan roller.

However, a leading end of the optical fiber preform may have a ratio between an external diameter of a core portion and an external diameter of a cladding portion, which does not meet a standard ratio. Because a core diameter and a cladding diameter of a glass optical fiber drawn from such a leading end do not meet standard diameters, the glass optical fiber cannot be used as a product. Therefore, the leading end of the optical fiber preform has been used in drawing for adjusting various drawing conditions when starting a process of manufacturing an optical fiber, and that drawn glass optical fiber has been discarded.

Japanese Patent Application Laid-open No. H10-330133 discloses a method of processing a leading end of an optical fiber preform that cannot be used as a product and should be discarded. In this method, the leading end of the optical fiber preform is processed using a processing apparatus including a pulling mechanism for pulling a glass optical fiber having an external diameter larger than a product-to-be optical fiber, a cutting mechanism for cutting the pulled glass optical fiber having the large external diameter, and an accommodating mechanism for accommodating the cut glass optical-fiber pieces.

However, since the above processing apparatus includes the pulling mechanism independent from a pulling mechanism for manufacturing the optical fiber, the apparatus becomes large. Further, because the glass optical fiber is processed while having the large external diameter, the processing apparatus needs to be arranged as directly below the draw heating furnace for the glass optical fiber as possible to perform the processing. As a result, a troublesome process has been required, in which a coating unit arranged below a draw heating furnace in a general apparatus for manufacturing an optical fiber is moved away once, a processing apparatus is arranged instead, a glass optical fiber is drawn and processed, the drawing of the glass optical fiber is stopped after the processing, the coating unit is returned to the original location, and an optical fiber is manufactured. Further, with the increase in the drawing speed, there has been a risk that a glass optical fiber at a high temperature and not sufficiently cooled down might enter the processing apparatus, damaging the processing apparatus.

There may also be a method of drawing and forming a coating, similarly to normal optical fibers, around a leading end of an optical fiber preform to be processed and winding up by a winding mechanism, without using the above processing apparatus. However, this method has a problem of consuming an extra amount of the coating material for the discarded optical fiber. Further, if a glass optical fiber is drawn without a coating formed thereon, because the glass optical fiber is very fragile and broken easily, the glass optical fiber cannot be wound up by a winding mechanism and processing becomes difficult.

SUMMARY OF THE INVENTION

It is an object of the present invention to at least partially solve the problems in the conventional technology.

According to an aspect of the present invention, an apparatus configured to process a glass optical fiber drawn from an optical fiber preform when drawing an optical fiber while fusing by heating and pulling by a pulling mechanism one end of the optical fiber preform, includes: an introducing unit configured to introduce the glass optical fiber that has passed the pulling mechanism; a shredding unit including a casing connected to the introducing unit and a shredding mechanism configured to shred the glass optical fiber introduced by the introducing unit in the casing into glass optical-fiber pieces; a carrier pipe connected to the casing of the shredding unit and configured to carry the glass optical-fiber pieces; and a suction unit connected to the carrier pipe and configured to suction the glass optical-fiber pieces via the carrier pipe.

According to another aspect of the present invention, a method of processing a glass optical fiber drawn from an optical fiber preform when drawing an optical fiber while fusing by heating and pulling by a pulling mechanism one end of the optical fiber preform includes: shredding the glass optical fiber that has passed the pulling mechanism into glass optical fiber pieces in the vicinity of the pulling mechanisms; suctioning the shredded glass optical-fiber pieces and carrying the glass optical-fiber pieces in a carrier pipe; and collecting the carried glass optical-fiber pieces.

According to yet another aspect of the present invention, a method of manufacturing an optical fiber includes: after processing a glass optical fiber using the method including shredding the glass optical fiber that has passed the pulling mechanism into glass optical fiber pieces in the vicinity of the pulling mechanisms, suctioning the shredded glass optical-fiber pieces and carrying the glass optical-fiber pieces in a carrier pipe, and collecting the carried glass optical-fiber pieces; drawing from the optical fiber preform an optical fiber around which a coating has been formed.

According to still another aspect of the present invention, a method of drawing an optical fiber in which a glass optical fiber is drawn while fusing by heating and pulling by a pulling mechanism one end of an optical fiber preform made of glass includes: drawing the glass optical fiber from the one end of the optical fiber preform while controlling a drawing speed to make an external diameter of the glass optical fiber larger than an external diameter of a product-to-be glass-optical fiber to be used to manufacture a product; adjusting an external diameter of the glass optical fiber to an external diameter passable through a die for forming a coating; and arranging the die around the glass optical fiber having the external diameter passable through the die.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a processing apparatus and a processing method of a glass optical fiber and a manufacturing method and a drawing method of an optical fiber according to the present invention will be explained below in detail with reference to the accompanying drawings. The present invention is not limited to the embodiments.

Figure 1:
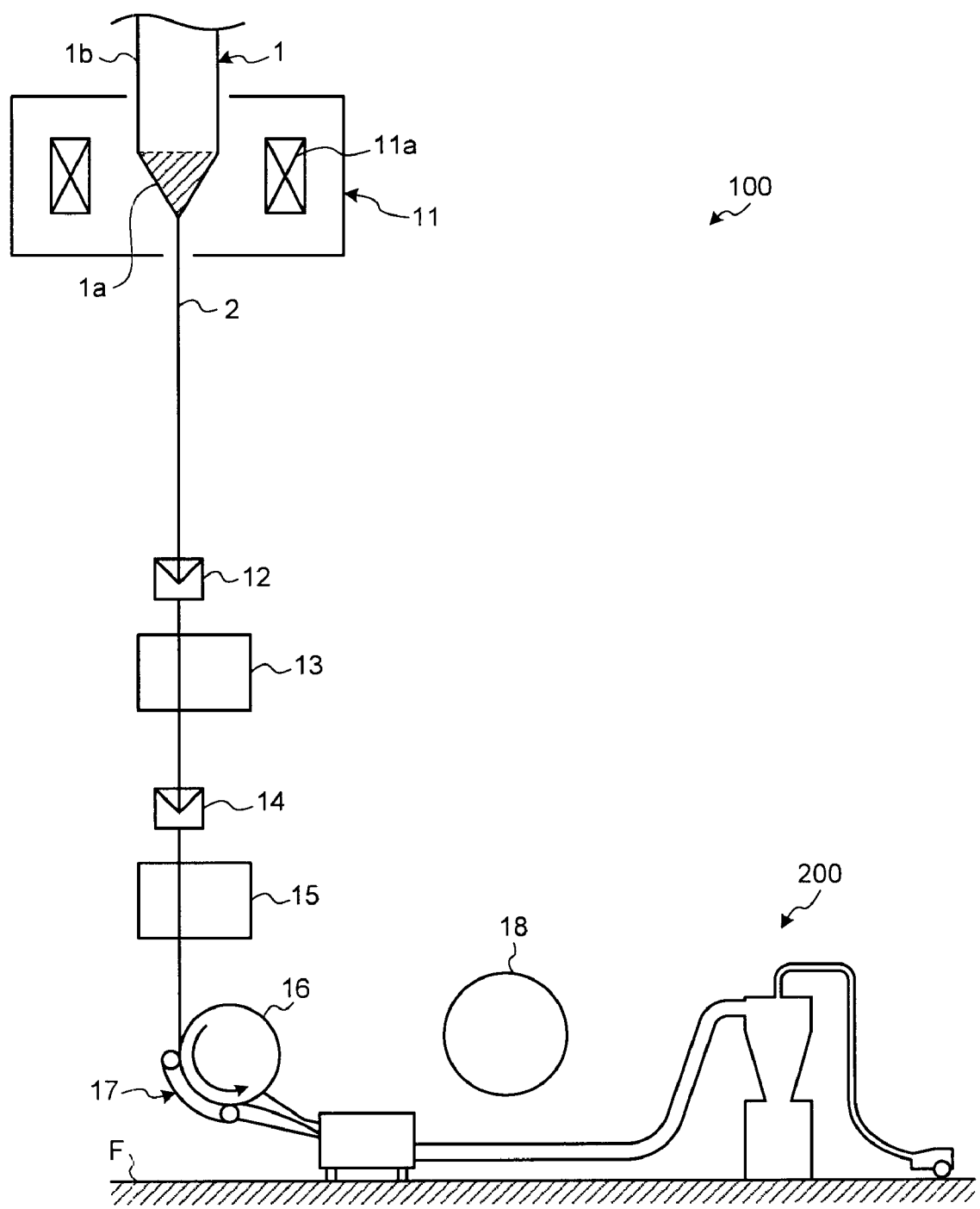
FIG. 1 is a schematic diagram of an overall configuration of an apparatus for manufacturing an optical fiber and an apparatus for processing an optical fiber used in a first embodiment of the present invention.

FIG. 1 is a schematic diagram of an overall configuration of a manufacturing apparatus of an optical fiber and a processing apparatus of a glass optical fiber used in a first embodiment of the present invention. As depicted in FIG. 1, a manufacturing apparatus 100 of an optical fiber includes a draw heating furnace 11 having a heater 11a and configured to fuse by heating one end of an optical fiber preform 1, a first resin coating unit 12 and a second resin coating unit 14 that coat an ultraviolet curable resin onto an optical fiber, a first resin curing unit 13 and a second resin curing unit 15 that cure the coated resin to form a coating, a capstan roller 16 and a pressing mechanism 17, which are provided as a drawing mechanism, and a winding mechanism 18. The first resin curing unit 13 and the second resin curing unit 15 are ultraviolet irradiating units, for example. The capstan roller 16 and the pressing mechanism 17 are separated as far from the drawing heating furnace 11 as possible to sufficiently cool a drawn optical fiber, and are arranged at a height close to a floor F. A processing apparatus 200 is described later in detail.

Figure 2:
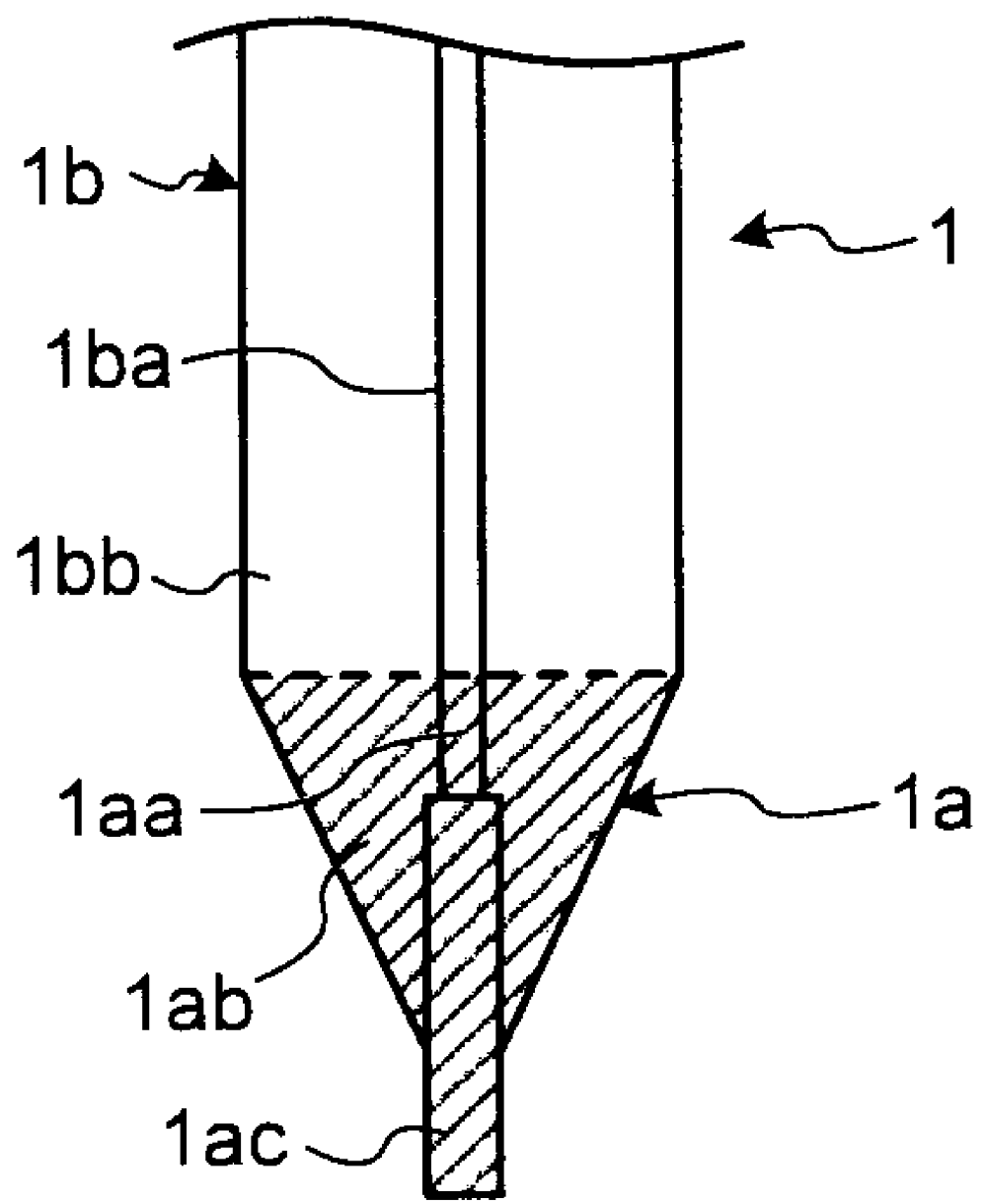
FIG. 2 is a schematic cross-sectional view of an optical fiber preform depicted in FIG. 1.

The optical fiber preform 1 is made of silica-based glass, and has a diameter of 100 millimeters and a length of 200 millimeters, for example. The optical fiber preform 1 has a defective part 1a and a non-defective part 1b. FIG. 2 is a schematic cross-sectional view of the optical fiber preform 1 depicted in FIG. 1. As depicted in FIG. 2, the non-defective part 1b of the optical fiber preform 1 includes a core portion 1ba and a cladding portion 1bb. The ratio of an external diameter of the core portion 1ba to an external diameter of the cladding portion 1bb satisfies a desired standard, and therefore an optical fiber drawn from the non-defective part 1b has a core diameter and a cladding diameter that satisfy the standard. On the contrary, the defective part 1a is at a leading end of the optical fiber preform 1, and has a core portion 1aa and a cladding portion 1ab. At the extreme leading end, a fake bar 1ac used to manufacture the optical fiber preform 1 is present instead of the core portion 1aa. The ratio of an external diameter of the core portion 1aa to an external diameter of the cladding portion 1ab does not meet a desired standard. Therefore, an optical fiber drawn from the defective part 1a becomes one having a core diameter and a cladding diameter not meeting the standard, or becomes an optical fiber having no core, and thus is to be discarded.

A processing method of an optical fiber drawn from the defective part 1a is explained below with reference to FIG. 1. First, the optical fiber preform 1 is set in the draw heating furnace 11, the defective part 1a at the leading end of the optical fiber preform 1 is then fused by heating by the heater 11a, and a glass optical fiber 2 is drawn.

The drawn glass optical fiber 2 sequentially passes the first resin coating unit 12, the first resin curing unit 13, the second resin coating unit 14, and the second resin curing unit 15. At this time, no dice are arranged in the first resin coating unit 12 and the second resin coating unit 14, and coating is not formed on the glass optical fiber 2.

Next, the capstan roller 16 and the pressing mechanism 17 pull the glass optical fiber 2. The drawn glass optical fiber 2 is introduced into the processing apparatus 200 and processed.

When the drawing speed of the drawing of the glass optical fiber 2 is faster, its efficiency becomes higher. However, when the speed is too fast, the temperature of the glass optical fiber 2 becomes high. Similarly, when the external diameter of the glass optical fiber 2 is larger, its efficiency becomes higher. However, when the diameter is too large, the heat capacity of the glass optical fiber becomes large, and the temperature of the glass optical fiber 2 becomes high. When the temperature of the glass optical fiber becomes excessively high, this may damage rubber parts of the capstan roller 16 and the pressing mechanism 17 in the manufacturing apparatus 100, and the processing apparatus 200. Therefore, the temperature of the glass optical fiber 2 in contact with the capstan roller 16 is preferably equal to or lower than 100° C., and more preferably equal to or lower than 50° C. Further, regarding an external diameter of the glass optical fiber 2, a non-coated fiber is very easily broken. Particularly, when the external diameter becomes larger, the non-coated fiber is broken even when it is slightly bent. Therefore, the non-coated fiber is frequently broken at a portion in contact with the capstan roller 16. For these reasons, the drawing speed is preferably 300 to 500 meters/minute, and the external diameter of the glass optical fiber 2 is 100 to 500 micrometers. To minimize disconnection, the external diameter of the glass optical fiber 2 is preferably 100 to 300 micrometers.

Figure 3:
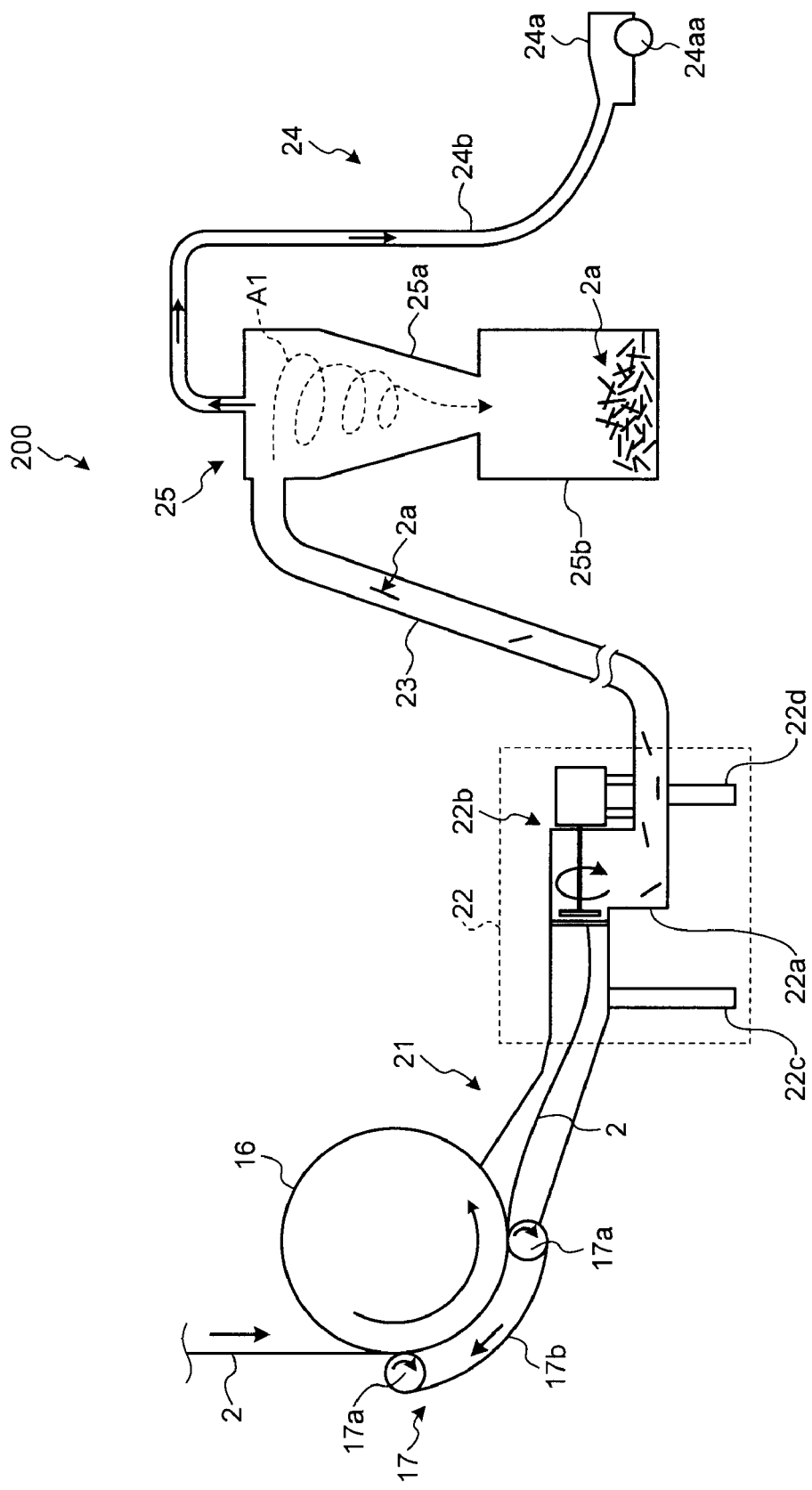
FIG. 3 is a schematic diagram of a configuration of the apparatus for processing a glass optical fiber depicted in FIG. 1.

The processing apparatus 200 and a method of processing the glass optical fiber 2 by the processing apparatus 200 are explained next. FIG. 3 is a schematic diagram of a configuration of the processing apparatus 200 of a glass optical fiber depicted in FIG. 1. The processing apparatus 200 includes an introducing member 21, a shredder 22, a carrier pipe 23, a suction unit 24, and a collecting unit 25.

In the processing apparatus 200, the introducing member 21 is arranged close to the capstan roller 16 and the pressing mechanism 17. The shredder 22 includes a casing 22a connected to the introducing member 21 and the carrier pipe 23, a shredding mechanism 22b, and legs 22c and 22d. The suction unit 24 includes a suction unit main body 24a having a moving tire 24aa, and a suction tube 24b. The collecting unit 25 is connected to the carrier pipe 23 and the suction unit 24, and includes a cyclone 25a and a collecting container 25b.

Operations by the processing apparatus 200 are explained with reference to FIG. 3. First, in a state in which the capstan roller 16 and the pressing mechanism 17 including rollers 17a and a rubber belt 17b are pulling the glass optical fiber 2, the introducing member 21 introduces the glass optical fiber 2 having passed through the capstan roller 16 and the pressing mechanism 17 into the casing 22a of the shredder 22. The shredding mechanism 22b of the shredder 22 shreds the glass optical fiber 2 introduced by the introducing member 21 in the casing 22a into glass optical-fiber pieces 2a.

The suction unit 24 suctions the shredded glass optical-fiber pieces 2a via the carrier pipe 23. By this suction, the carrier pipe 23 carries the glass optical-fiber pieces 2a and particles generated when shredding the glass optical fiber 2, together with air. To prevent clogging of the glass optical-fiber pieces 2a in the carrier pipe 23, the length of the glass optical-fiber pieces 2a is preferably equal to or smaller than 500 millimeters, and more preferably equal to or smaller than 20 millimeters. By shredding the glass optical fiber 2 into small glass optical-fiber pieces 2a like this, the accommodation volume of the glass optical-fiber pieces 2a becomes smaller than that before the shredding. Therefore, the operability in disposal and transport of the glass optical-fiber pieces 2a is improved.

The glass optical-fiber pieces 2a, particles, and air carried by the carrier pipe 23 are introduced into the cyclone 25a of the collecting unit 25. In the cyclone 25a, the glass optical-fiber pieces 2a are separated from air and particles to facilitate filtering of the suction unit 24, protection of a dust pack, and takeout of the glass optical-fiber pieces 2a after finishing the processing. The separated glass optical-fiber pieces 2a fall as indicated by an arrow A1 and are accommodated into the collecting container 25b. On the other hand, air and particles pass through the suction tube 24b, and reach the suction unit main body 24a. Particles are captured by a filter in the suction unit main body 24a, and air is appropriately discharged. Because a drawing unit is within a clean room, the filter is preferably a hepafilter capable of capturing particles of 0.3 micrometer.

Because the processing apparatus 200 has the shredder 22 separated, the shredder 22 may be small and arranged even if a space between the capstan roller 16 and the floor F is small. Therefore, the troublesome step of changing the arrangement of each unit such as the first resin coating unit 12 is able to be omitted, and the glass optical fiber 2 is able to be processed easily. Because the capstan roller 16 of the manufacturing apparatus 100 of an optical fiber may be directly used as a pulling mechanism, the device as a whole may be small. Because the drawn glass optical fiber 2 is able to be processed in a sufficiently cooled state, the glass optical fiber is able to be processed safely without damaging the apparatus. Because the suction unit 24 and the collecting unit 25 are connected to the shredder 22 via the carrier pipe 23, the suction unit 24 and the collecting unit 25 may be arranged separately from the shredder 22, and arranged not to interfere with the winding mechanism 18 as depicted in FIG. 1, for example. Because the processing apparatus 200 is small as described above and has a high degree of freedom in its arrangement, the device excels in space saving. Because the shredded glass optical-fiber pieces 2a are collected by suctioning, the glass optical-fiber pieces 2a and particles generated upon shredding are prevented from being scattered in the room.

Figure 4:
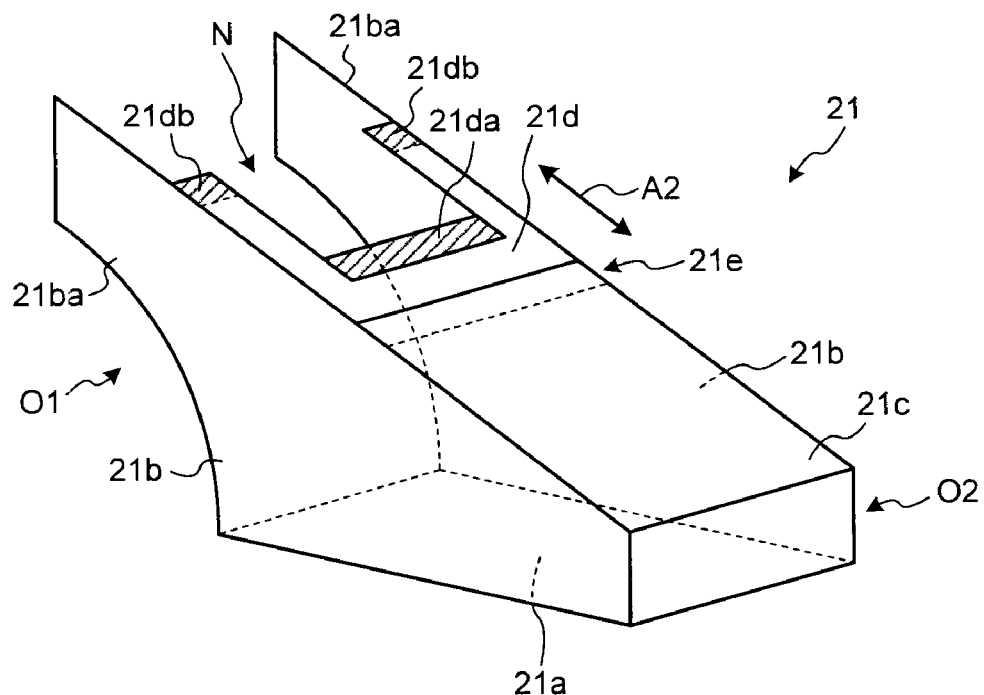
FIG. 4 is a schematic perspective view of an introducing member of the processing apparatus depicted in FIG. 3.

A configuration of the processing apparatus 200 is explained next in further detail. FIG. 4 is a schematic perspective view of the introducing member 21 of the processing apparatus 200 depicted in FIG. 3. As depicted in FIG. 4, the introducing member 21 includes a bottom surface 21a, side surfaces 21b, and an upper surface portion 21c constituting a main body, and further includes a movable unit 21d fitted to the upper surface portion 21c. The introducing member 21 has an opening O1 facing the capstan roller 16, and an opening O2 connected to the shredder 22, and is rectangular-tube-shaped such that, overall, the cross-sectional area decreases from the opening O1 toward the opening O2. The introducing member 21 receives the glass optical fiber 2 having passed the capstan roller 16 and the pressing mechanism 17, from the opening O1, and introduces the glass optical fiber 2 from the opening O2 to the shredder 22. A material of the bottom surface 21a to the movable unit 21d may be a plastic or a metal such as aluminum, but is not particularly limited thereto. The length between the openings O1 and O2 is preferably small, for example, equal to or smaller than 200 millimeters, to prevent disconnection of the glass optical fiber 2 in the introducing member 21.

The side surfaces 21b have guides 21ba projecting towards the opening O1. The movable unit 21d has a notch N, and the capstan roller 16 is fitted to the notch N. The movable unit 21d includes impact relieving members 21da and 21db made of an elastic material such as rubber at an end facing the capstan roller 16.

Figure 5:
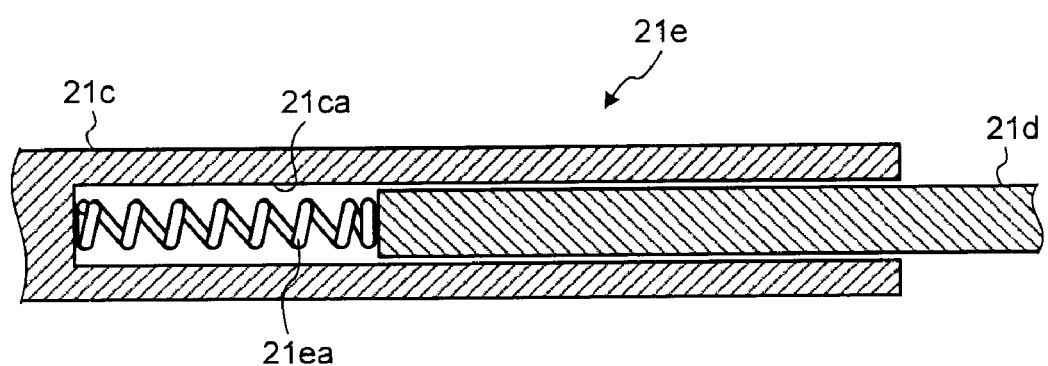
FIG. 5 is a schematic cross-sectional view of a fitting unit to an upper surface portion of a movable unit of the introducing member depicted in FIG. 4.

The movable unit 21d is fitted with the upper surface portion 21c to slide in a direction of an arrow A2 and restore to an initial position when the movable unit 21d has slid. FIG. 5 is a schematic cross-sectional view of a fitting unit 21e to the upper surface portion 21c of the movable unit 21d depicted in FIG. 4. As depicted in FIG. 5, a trench 21ca of a predetermined depth is formed at the upper surface portion 21c in a width direction thereof. A part of the movable unit 21d is fitted into the trench 21ca and the movable unit 21d is configured to slide. A spring 21ea is provided inside the trench 21ca by having one end of the spring 21ea fixed to a bottom of the trench 21ca and the other end fixed to an end of the movable unit 21d. The movable unit 21d is thus configured to restore to an initial position even if the movable unit 21d slides.

Figure 6:
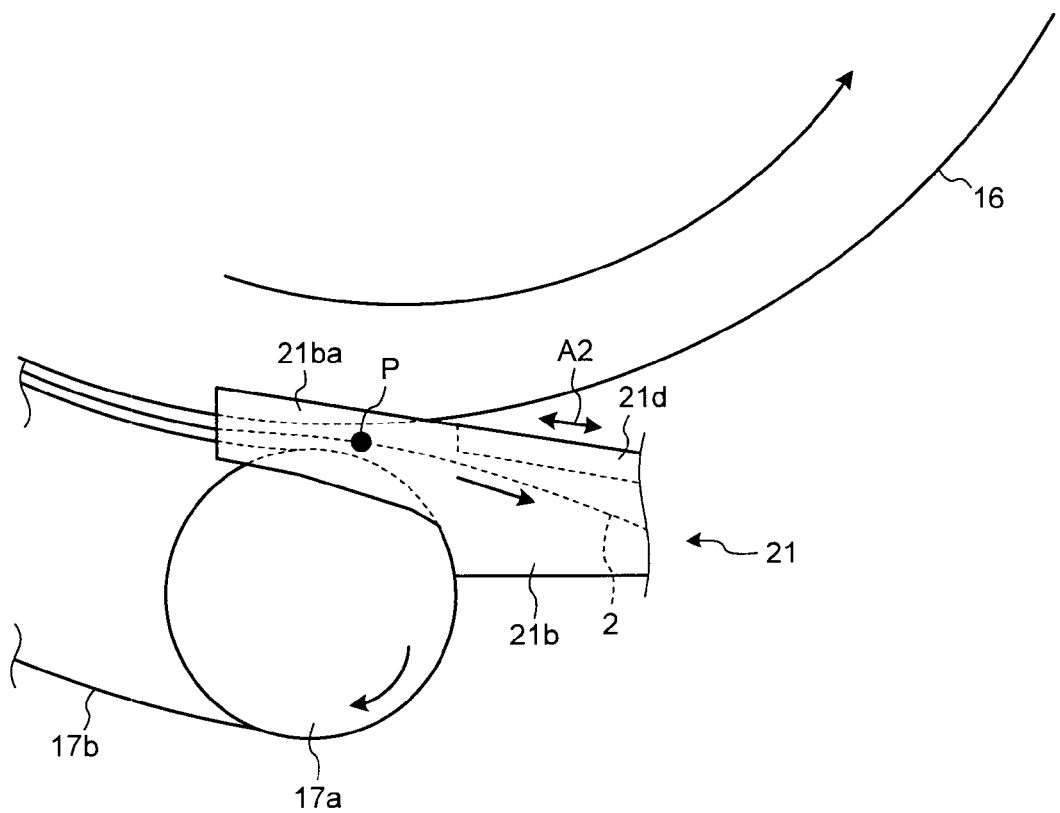
FIG. 6 depicts the introducing member depicted in FIG. 4 arranged to be fitted with a capstan roller.

Operations of the movable unit 21d and the guide 21ba of the side surface 21b are explained next. FIG. 6 depicts the introducing member 21 depicted in FIG. 4 arranged to fit with the capstan roller 16. As depicted in FIG. 6, the introducing member 21 is arranged as close to the capstan roller 16 as possible such that the glass optical fiber 2 is securely introduced into the processing apparatus 200. If the capstan roller 16 contacts the introducing member 21 with its position displaced when rotating at a high speed, there is a risk that the whole processing apparatus 200 is moved and the glass optical fiber 2 is pulled out from the processing apparatus 200. Therefore, in the processing apparatus 200, the movable unit 21d slides so as to be able to be restored in a direction of the arrow A2. As a result, impact is absorbed by the sliding of the movable unit 21d even if the capstan roller 16 contacts the introducing member 21, and the movement of the processing apparatus 200 is prevented. The impact relieving members 21da and 21db relieve the impact, and prevent the movement of the processing apparatus 200 and damage to the introducing member 21.

Further, the guide 21ba of the side surface 21b is projected to cover a position P at which the glass optical fiber 2 goes away from a surface of the capstan roller 16.

As a result, even if the glass optical fiber 2 leaves towards the side surfaces of the capstan roller 16 during the pulling, the glass optical fiber 2 is restrained by the guide 21ba, and thus the glass optical fiber 2 is prevented from being pulled out from the processing apparatus 200.

Figure 7:
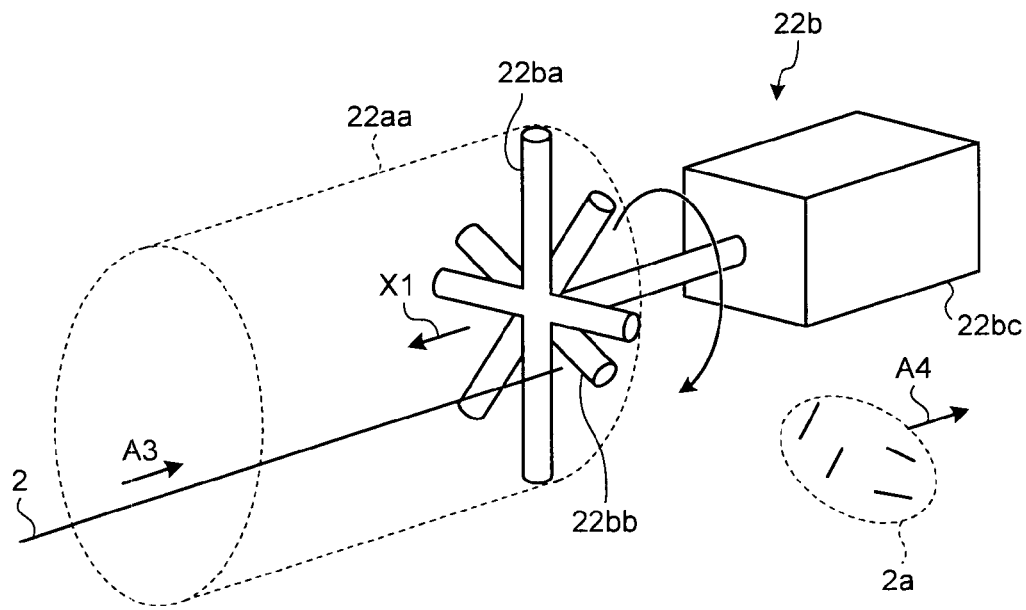
FIG. 7 is a schematic perspective view of a shredding mechanism depicted in FIG. 3.

The shredding mechanism 22b is explained next. FIG. 7 is a schematic perspective view of the shredding mechanism 22b depicted in FIG. 3. As depicted in FIG. 7, the shredding mechanism 22b includes four fixed shredding bars 22ba, four movable shredding bars 22bb as rotors, and a motor 22bc as a rotating unit rotating the movable shredding bars 22bb.

The fixed shredding bars 22ba are placed to cross a path of the glass optical fiber 2, in a part 22aa of the casing 22a This part 22aah is connected to the introducing member 21. An arrow A3 indicates an advancing direction of the glass optical fiber 2. The movable shredding bars 22bb are arranged to cross the path of the glass optical fiber 2, and rotate around an axis X1, which is a rotation axis, in a direction parallel with the advancing direction of the glass optical fiber 2 by the motor 22bc. When the movable shredding bars 22bb are rotated by the motor 22bc, the fixed shredding bars 22ba and the movable shredding bars 22bb sandwich the glass optical fiber 2 advancing to gaps between the fixed shredding bars 22ba and the movable shredding bars 22bb, thereby shredding the glass optical fiber 2 into the glass optical-fiber pieces 2a. The glass optical-fiber pieces 2a are suctioned and carried in a direction of an arrow A4 by the suction unit 24. The rotation speed of the movable shredding bars 22bb may be set such that the glass optical-fiber pieces 2a have a desired length according to, for example, the linear velocity of the glass optical fiber 2 drawn, an internal diameter of the carrier pipe 23, and suction force of the suction unit 24, and may be, for example, 1000 to 2000 rpm.

Materials of the fixed shredding bars 22ba and the movable shredding bars 22bb are not particularly limited so long as these bars are able to shred the glass optical fiber 2 upon contact with the glass optical fiber 2. The materials preferably have high toughness because the fixed shredding bars 22ba and the movable shredding bars 22bb are abraded by the shredding. For example, it is preferably made of a metal such as stainless steel, carbon steel, or aluminum.

Preferably, the carrier pipe 23 and the suction tube 24b are made of highly flexible materials and have a cornice structure, so that the degree of freedom of arrangement of the collecting unit 25 and the suction unit 24 is increased and space is saved. Internal diameters of the carrier pipe 23 and the suction tube 24b are preferably, for example, equal to or larger than 30 millimeters depending on a suction pressure of the suction unit 24. A commercially available cleaner may be used as the suction unit 24. Considering pressure loss in the carrier pipe 23, the suction tube 24b, and the collecting unit 25, the suction unit 24 preferably has suction power defined by the JIS C9108 of equal to or smaller than 500 W, so that clogging of the glass optical-fiber pieces 2a and particles in the introducing member 21, the shredder 22, the carrier pipe 23, and the suction tube 24b is infallibly prevented.

Figure 8:
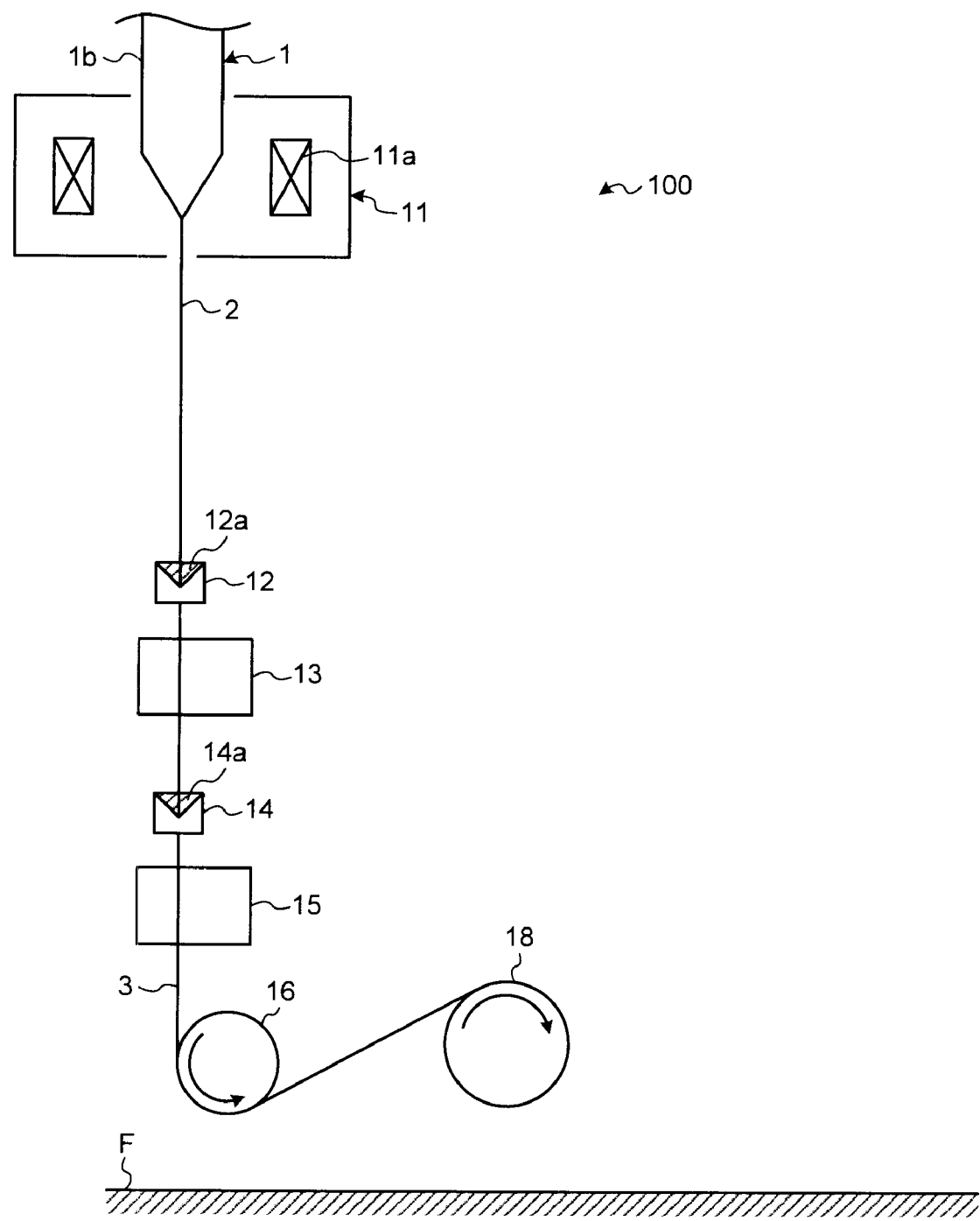
FIG. 8 depicts a state of newly drawing an optical fiber.

The glass optical fiber 2 drawn from the defective part 1a of the optical fiber preform is processed as described above. After finishing the processing, the introducing member 21 and the shredder 22 may be separated from the capstan roller 16. The pressing mechanism 17 may also be detached as necessary. As depicted in FIG. 8, the glass optical fiber 2 with its external diameter decreased to about 125 micrometers is drawn following a general process of manufacturing an optical fiber. The optical fiber preform 1 for which the drawing from the defective part 1a has been finished as a whole consists of the non-defective part 1b. Therefore, the glass optical fiber 2 that satisfies the standard is able to be drawn from the optical fiber preform 1, and an optical fiber 3 is usable as a product is manufacturable using the drawn glass optical fiber 2. Specifically, a resin 12a is coated on the drawn glass optical fiber 2 by the first resin coating unit 12 in which a die is arranged, the first resin curing unit 13 cures the coated resin to form a first coating, the second resin coating unit 14 in which a die is arranged further coats a resin 14a on the glass optical fiber 2, and the second resin curing unit 15 cures the coated resin to form a second coating, to manufacture the optical fiber 3 having a coating formed around it. The optical fiber 3 is pulled by the capstan roller 16, and wound up by the winding mechanism 18.

To shift from the processing of the glass optical fiber 2 to the manufacturing of the optical fiber 3, only the introducing member 21 and the shredder 22 need to be moved, and each part of the manufacturing apparatus 100, the suction unit 24, and the collecting unit 25 do not need to be moved. Therefore, as compared with a case of using a conventional apparatus for processing a leading end of an optical fiber preform, the operational steps become less troublesome, and it is possible to shorten the time for the operations. As compared with a case of forming a resin coating on the glass optical fiber 2, the amount of used resin is saved. According to the present embodiment, the manufacture of an optical fiber is facilitated, and an optical fiber is economically manufacturable.

The shredding mechanism of the shredder 22 is not limited to that depicted in FIG. 7. For example, by using a blade as a rotor, the blade may be brought into contact with the glass optical fiber 2 by rotating the blade, thereby shredding the glass optical fiber 2.

Figure 9:
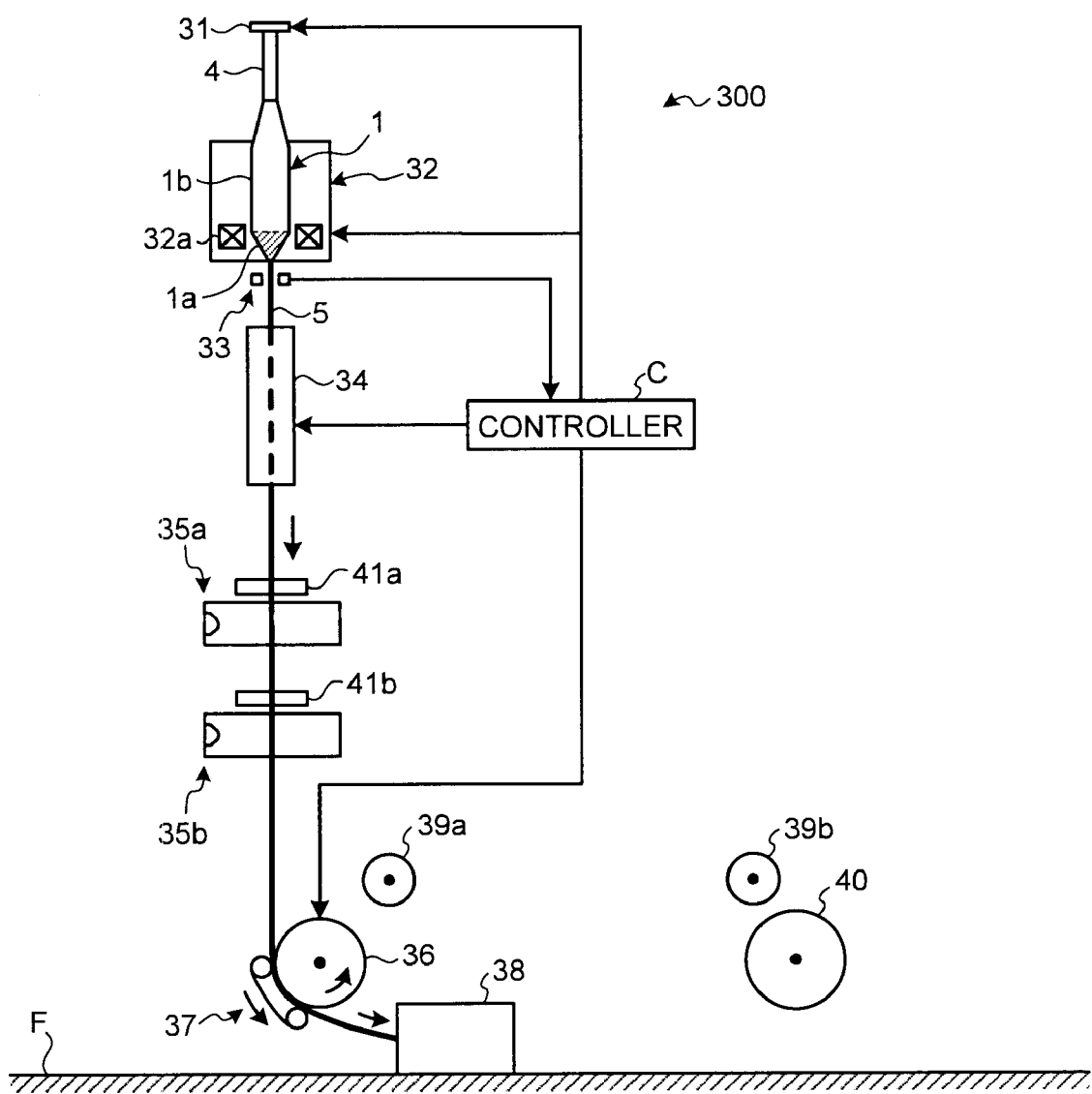
FIG. 9 is a schematic diagram of an overall configuration of an apparatus for manufacturing an optical fiber used in a second embodiment.

A drawing method of an optical fiber according to a second embodiment of the present invention is explained next. FIG. 9 is a schematic diagram of an overall configuration of a manufacturing apparatus of an optical fiber used in the second embodiment. As depicted in FIG. 9, a manufacturing apparatus 300 of an optical fiber includes: an elevating mechanism 31 that holds a supporting bar 4 made of glass fused to an upper end of the optical fiber preform 1 and moves the optical fiber preform 1 up and down; a draw heating furnace 32 having a heater 32a and for fusing by heating one end of the optical fiber preform 1; an external-diameter measuring unit 33 that measures an external diameter of a glass optical fiber 5 drawn from the optical fiber preform 1; a cooling column 34 capable of cooling the glass optical fiber 5 by blowing He gas thereto; resin coating units 41a and 41b arranged on a path of the glass optical fiber 5; ultraviolet (UV) lamp irradiating chambers 35a and 35b; a capstan roller 36 made of rubber as a pulling mechanism; a pressing mechanism 37 having a rubber belt applied between two rollers; an optical-fiber collecting container 38; guide rolls 39a and 39b; and a winding mechanism 40. The manufacturing apparatus 300 further includes a controller C that takes in data of an external diameter of the glass optical fiber 5 measured by the external-diameter measuring unit 33, and controls the elevating mechanism 31, the draw heating furnace 32, the cooling column 34, and the capstan roller 36 based on the data of the external diameter.

The capstan roller 36 is spaced as far from the draw heating furnace 32 as possible to sufficiently cool the glass optical fiber 5, and is arranged at a height close to the floor F. To prevent the capstan roller 36 from being damaged by heat, the temperature of the glass optical fiber 5 in contact with the capstan roller 36 is preferably equal to or lower than 100° C., and more preferably equal to or lower than 50° C.

The optical fiber preform 1 used in the second embodiment is that depicted in FIG. 2, and has the defective part 1a and the non-defective part 1b. As described above, the optical fiber preform 1 is made of silica-based glass, and has a diameter of 100 millimeters and a length of 2000 millimeters, for example.

The drawing method of an optical fiber from the defective part 1a is explained next with reference to FIG. 9. First, the optical fiber preform 1 having the supporting bar 4 fused to an upper end of the optical fiber preform 1 is set in the draw heating furnace 32, and the supporting bar 4 is held by the elevating mechanism 31. The defective part 1a at the leading end of the optical fiber preform 1 is fused by heating by the heater 32a, and a glass optical fiber is drawn, while the optical fiber preform 1 is fed downward by the elevating mechanism 31. The external-diameter measuring unit 33 measures the external diameter of the drawn glass optical fiber 5, and transmits the data to the controller C. The glass optical fiber 5 passes through the cooling column 34, and sequentially passes the resin coating unit 41a in which no die is arranged, the UV lamp irradiating chamber 35a in which a UV lamp is turned off, the resin coating unit 41b in which no die is arranged, and the UV lamp irradiating chamber 35b in which a UV lamp is turned off. In this case, the glass optical fiber 5 is not cooled, and no coating is formed. The capstan roller 36 pulls the glass optical fiber 5 while the glass optical fiber 5 is pressed against a surface of the capstan roller 36 by a rubber belt of the pressing mechanism 37. The optical-fiber collecting container 38 introduces the glass optical fiber 5 into the container, and collects the glass optical fiber 5.

The optical-fiber collecting container 38 collects the glass optical fiber 5. A container hollow inside and made of a metal or a plastic may be used for the optical-fiber collecting container 38. To collect the glass optical fiber more smoothly, a rotation mechanism that shreds the glass optical fiber may be provided in the optical-fiber collecting container 38. The processing apparatus 200 used in the first embodiment may be also used as the optical-fiber collecting container 38, to collect the glass optical fiber more smoothly.

In the second embodiment, in drawing an optical fiber from the defective part 1a, the glass optical fiber 5 is drawn to have a larger external diameter than an external diameter of a product-to-be glass optical fiber while controlling the linear velocity. As a result, the defective part 1a is quickly consumed, and manufacturing of an optical fiber that becomes a product is able to be quickly started using the non-defective part 1b.

In the second embodiment, the drawing speed is decreased after consuming the defective part 1a by drawing a predetermined amount of the glass optical fiber 5. Thereafter, a die for forming a coating around the glass optical fiber 5 is arranged while continuing drawing of the glass optical fiber 5. In this way, the drawing speed is decreased, and the die is fitted while keeping the drawing. Therefore, troublesome work such as moving the coating unit and the processing apparatus and a positional adjustment when the coating unit is returned to an original position is not required. Accordingly, manufacturing of an optical fiber that becomes a product is able to be started quickly and easily.

Figure 10:
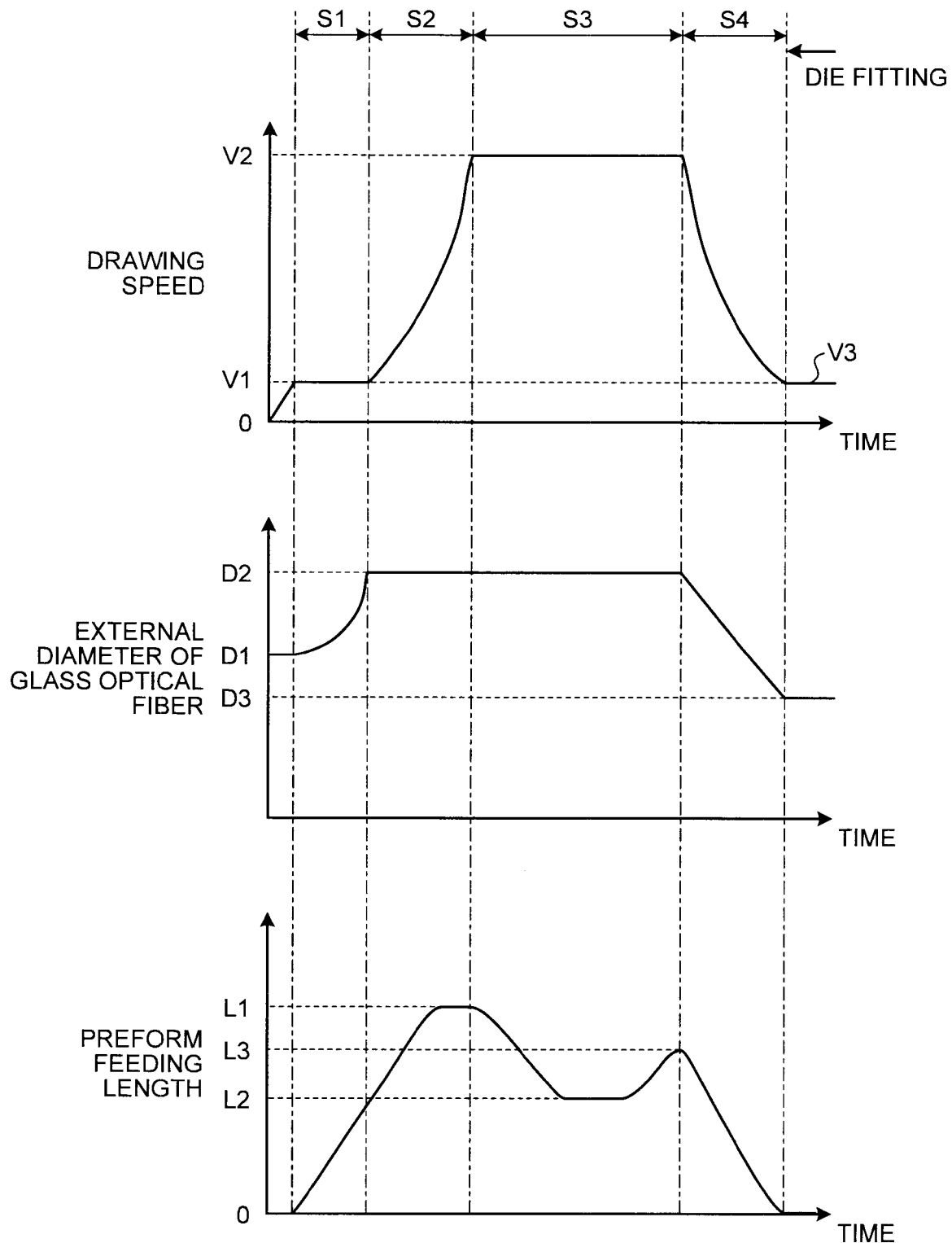
FIG. 10 is a timing chart of an example of control of drawing speed (linear velocity) of a glass optical fiber, external diameter of the glass optical fiber, and feeding length of the optical fiber preform (preform feeding length) in the second embodiment.

The drawing control in the second embodiment is explained next with reference to FIG. 10. FIG. 10 is a timing chart of an example of control of a drawing speed of a glass optical fiber, an external diameter of a glass optical fiber, and a feeding length of an optical fiber preform. The timing chart depicted in FIG. 10 is an example, and is not limited thereto.

Each of the above control is performed by the controller C. Specifically, the drawing speed is controlled by controlling the rotation speed of the capstan roller 36 by the controller C. A preform feeding length is controlled by controlling the moved up/down amount of the elevating mechanism 31 by the controller C. The external diameter of the glass optical fiber 5 is controlled by controlling the elevating mechanism 31 and the capstan roller 36 based on data from the external-diameter measuring unit 33 by the controller C. The preform feeding length is a feeding length of an optical fiber preform from a predetermined height position downward.

First, in a section S1, as a first controlling process, an external diameter of the glass optical fiber 5 is increased from an initial external diameter D1 to a target external diameter D2 by increasing the preform feeding length while maintaining a drawing speed V1 slower than a target drawing speed V2. Preferably, the drawing speed V1 is 50 to 100 m/minute, the external diameter D1 is 100 to 300 micrometers, and the target external diameter D2 is 200 to 500 micrometers, most preferably, equal to or smaller than 400 micrometers. For example, the drawing speed V1 is 70 meters/minute, the external diameter D1 is 200 micrometers, and the target external diameter D2 is 300 micrometers.

After an external diameter of the glass optical fiber 5 reaches the target external diameter D2, the drawing speed is accelerated to the target drawing speed V2 while maintaining an external diameter of the glass optical fiber 5 at the target external diameter D2 in a second controlling process in a section S2. A preferable value of the target drawing speed V2 is 200 to 500 meters/minute, and is 325 meters/minute, for example. The preform feeding length is controlled to maintain an external diameter of the glass optical fiber 5 at the target external diameter D2. In the second embodiment, a feeding length L1 is increased to 150 millimeters. The drawing speed is increased while maintaining an external diameter of the glass optical fiber 5 at the target external diameter D2, thereby quickly consuming the defective part 1a.

After the drawing speed of the glass optical fiber 5 reaches the target drawing speed V2, the target external diameter D2 and the target drawing speed V2 are maintained in a third controlling process in a section S3, thereby maintaining a quick consumption of the defective part 1a. In the section S3, the preform feeding length of the optical fiber preform 1 is controlled to maintain the target external diameter D2 and the target drawing speed V2. When the preform feeding length of the optical fiber preform 1 exceeds a length of a tapered part of the leading end of the optical fiber preform 1, the preform feeding length is once decreased, and thereafter, the preform feeding length is increased. Consequently, the leading end of the optical fiber preform 1 is able to be dropped by fusion in a short period of time at the start of the drawing, and the supply amount of the optical fiber preform 1 is able to be optimized. In the second embodiment, a minimum feeding length L2 in the section S3 is set to 35 millimeters.

Subsequently, when the preform feeding length of the optical fiber preform 1 reaches a feeding length L3 and also reaches a predetermined position measured in advance, this means that the defective part 1a has all been consumed for drawing the glass optical fiber 5. Thereafter, in a section S4, an external diameter of the glass optical fiber 5 is decreased and the drawing speed is decreased, while decreasing the preform feeding length. The feeding length L3 is about 90 millimeters.

In the section S4, an external diameter of the glass optical fiber 5 is set to the external diameter D3 and the drawing speed is set to the drawing speed V3. The external diameter D3 is of a size capable of passing through a die for forming a coating, for example, 100 to 250 micrometers, and particularly, 200 micrometers. For example, the drawing speed V3 is 50 to 100 meters/minute, and particularly 70 meters/minute.

After the section S4 is finished, dice are fitted into the resin coating units 41a and 41b while maintaining the drawing speed of the glass optical fiber 5 at the drawing speed V1, maintaining an external diameter at the external diameter D3, and continuing drawing. In the second embodiment, a primary die and a secondary die are fitted to form a coating of a two-layer structure with a primary layer and a secondary layer. When the dice are fitted, the optical-fiber collecting container 38 is moved and the pressing mechanism 37 is removed.

Figure 11:
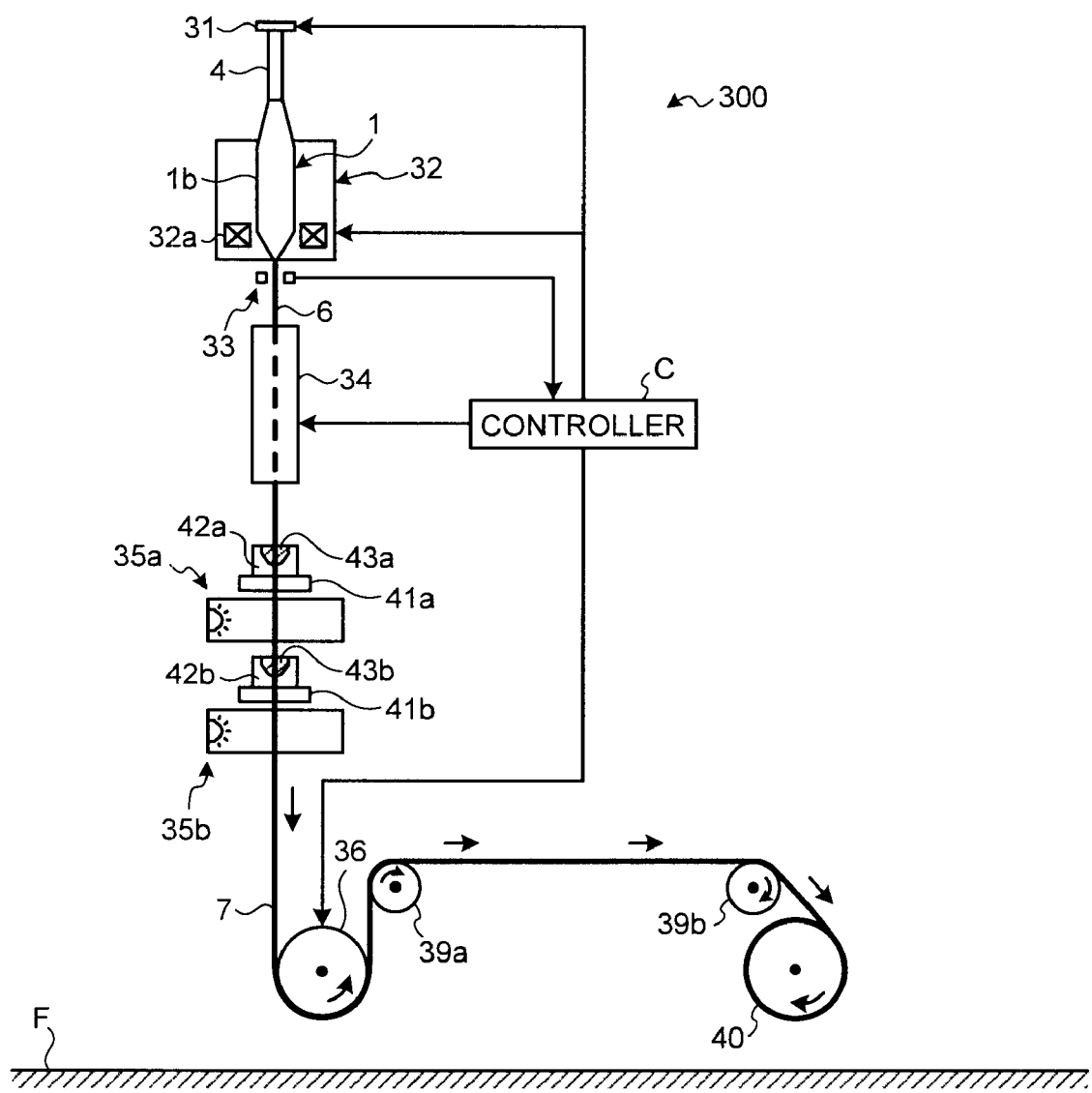
FIG. 11 is a schematic diagram of a state of manufacturing a product-to-be optical fiber.

Thereafter, as depicted in FIG. 11, a product-to-be glass optical fiber 6 is drawn according to a general process of manufacturing an optical fiber. In this case, the drawing speed of the glass optical fiber 6 is increased to 1500 meters/minute, and the external diameter is set at a predetermined value within a range of 80 to 130 micrometers, for example. The optical fiber preform 1 for which the drawing from the defective part 1a has finished as a whole consists of the non-defective part 1b. Therefore, the glass optical fiber 6 that satisfies a standard such as a product specification is able to be drawn from the optical fiber preform 1. In drawing the glass optical fiber 6, the cooling column 34 controlled by the controller C cools the glass optical fiber 6. Therefore, the drawing speed is settable considerably high as described above. After the cooling column 34 cools the glass optical fiber 6, a primary die 42a supplied with a resin 43a for a primary coating coats the resin 43a on the glass optical fiber 6, and the UV lamp irradiating chamber 35a cures the resin 43a, thereby forming the primary coating. A secondary die 42b supplied with a resin 43b for a secondary coating coats the resin 43b around the primary coating, and the UV lamp irradiating chamber 35b cures the resin 43b, thereby forming the secondary coating. As a result, an optical fiber 7 having a coating formed thereon is manufactured. The optical fiber 7 is pulled by the capstan roller 36 which is the same as that used to draw the glass optical fiber 5, guided by the guide rolls 39a and 39b, and wound up by the winding mechanism 40.

When shifting from the drawing of the glass optical fiber 5 to the drawing of the product-to-be glass optical fiber 6 and to the manufacturing of the optical fiber 7, the only necessary operation is fitting and arranging the primary die 42a and the secondary die 42b in a supporting mechanism. It is thus not necessary to move the UV lamp irradiating chambers 35a and 35b, the primary die 42a, and the secondary die 42b, and adjust their positions by restoring them to their original positions. Therefore, manufacturing of an optical fiber that becomes a product is able to be started quickly and easily.

Because no resin is coated on the glass optical fiber 5 drawn from the defective part 1a, the amount of a resin used is saved. Therefore, according to the second embodiment, the manufacturability of an optical fiber is improved, and an optical fiber is economically manufacturable.

In the first embodiment, in processing the glass optical fiber 2 by the processing apparatus 200, manufacturing of an optical fiber that becomes a product is able to be quickly and easily started by controlling the drawing speed of the glass optical fiber 2 as depicted in FIG. 10 in the second embodiment, for example.

Although an optical fiber preform having a defective part at a leading end is explained in the first and second embodiments, the present invention may also be applied to an optical fiber preform having a part to be processed such as a defective part at a position other than the leading end.

According to an embodiment of the present invention, a processing apparatus and a processing method of a glass optical fiber excellent in space saving and capable of easily and safely processing an optical fiber, and a manufacturing method of an optical fiber using the processing apparatus and the processing method are realized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus configured to process a glass optical fiber drawn from an optical fiber preform when drawing an optical fiber while fusing by heating and pulling by a capstan roller one end of the optical fiber preform, the apparatus comprising:
   a guide configured to introduce the glass optical fiber that has passed the capstan roller,
   wherein the guide includes:
      a slidable cover including a notch configured to fit with the capstan roller;
      a sliding mechanism that attaches the slidable cover slidably with respect to a main body of the guide; and
      a fitting unit configured to restore the slidable cover to an initial position when the slidable cover has slid;
   a shredding unit including a casing connected to the guide and a shredder with rotating blades configured to shred the glass optical fiber introduced by the guide in the casing into glass optical-fiber pieces;
   a carrier pipe connected to the casing of the shredding unit and configured to carry the glass optical-fiber pieces;
   a vacuum connected to the carrier pipe and configured to suction the glass optical-fiber pieces via the carrier pipe; and
   a collector unit connected to the carrier pipe and the vacuum and configured to collect the glass optical-fiber pieces carried by the carrier pipe,
   wherein the collector unit includes:
      a cyclone configured to separate the glass optical-fiber pieces from a gas and particles that have been carried together with the glass optical-fiber pieces; and
      a collecting container consecutively connected at the bottom of the cyclone and configured to accommodate the separated glass optical-fiber pieces, and
      wherein the vacuum is connected to a top portion of the cyclone via a suction tube.

2. The apparatus according to claim 1, wherein the shredder with rotating blades includes:
   a rotating unit; and
   a rotor configured to be rotated by the rotating unit and to shred the glass optical fiber by the rotation.

3. The apparatus according to claim 1, wherein the slidable cover includes an impact relieving member made of an elastic material at an end facing the capstan roller.

* * * * *